US012652593B2

(12) United States Patent
Dai et al.

(10) Patent No.: US 12,652,593 B2
(45) Date of Patent: Jun. 9, 2026

(54) METHOD AND APPARATUS FOR REPORTING TIME INFORMATION OF CHO

(71) Applicant: LENOVO (BEIJING) LIMITED, Beijing (CN)

(72) Inventors: Mingzeng Dai, Shanghai (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 686 days.

(21) Appl. No.: 18/007,167

(22) PCT Filed: Jul. 27, 2020

(86) PCT No.: PCT/CN2020/104915
§ 371 (c)(1),
(2) Date: Jan. 27, 2023

(87) PCT Pub. No.: WO2022/021015
PCT Pub. Date: Feb. 3, 2022

(65) Prior Publication Data
US 2023/0239760 A1      Jul. 27, 2023

(51) Int. Cl.
*H04W 36/24* (2009.01)
*H04W 36/30* (2009.01)
*H04W 36/36* (2009.01)
*H04W 36/00* (2009.01)

(52) U.S. Cl.
CPC ....... *H04W 36/249* (2023.05); *H04W 36/305* (2018.08); *H04W 36/362* (2023.05); *H04W 36/035* (2023.05)

(58) Field of Classification Search
CPC ............ H04W 36/249; H04W 36/305; H04W 36/362
See application file for complete search history.

(56) References Cited

U.S. PATENT DOCUMENTS

2020/0045602 A1* 2/2020 Jiang ................. H04W 36/0058

FOREIGN PATENT DOCUMENTS

| CN | 110831081 A | 2/2020 |
| WO | 2018188078 A1 | 10/2018 |
| WO | 2019134163 A1 | 7/2019 |
| WO | 2019175463 A1 | 9/2019 |
| WO | 2020118488 A1 | 6/2020 |
| WO | 2020135777 A1 | 7/2020 |

OTHER PUBLICATIONS

Lenovo et al. "RLF report for CHO MRO" 3GPP TSG-RAN WG3 Meeting #109-e, R3-204918; Aug. 28, 2020; 4 pages.
(Continued)

*Primary Examiner* — Myron Wyche
(74) *Attorney, Agent, or Firm* — AMPACC Law Group, PLLC

(57) ABSTRACT

Embodiments of the present application are directed to a method and apparatus for reporting time information of conditional handover (CHO). In an embodiment of the present application, the method includes: receiving configuration information on CHO, and transmitting time information of CHO in response to at least one failure that occurs during a CHO procedure.

18 Claims, 14 Drawing Sheets

(56)  References Cited

OTHER PUBLICATIONS

International Search Report and Written Opinion dated Mar. 5, 2021 for International Application No. PCT/CN2020/104915.

Lenovo et al. "Remaining issues for failure handling" 3GPP TSG-RAN WG2 Meeting #108, R2-1915130, Nov. 18-22, 2019; pp. 1-3.

ZTE Corporation et al. "Further issues for CHO configuration and execution" 3GPP TSG-RAN WG2 Meeting #107, R2-1913483, Oct. 14-18, 2019; pp. 1-8.

European Search Report dated Mar. 15, 2024 for European Patent Application No. 20947554.0.

Huawei et al. "Discussion on RLF reporting for SON" 3GPP TSG-RAN WG2 Meeting#107 R2-1909738; Aug. 30, 2019; 6 pages.

Nokia et al. "On RLF reporting for CHO and DAPS" 3GPP TSG-RAN WG2 Meeting #108 R2-1915497; Nov. 22, 2019; 3 pages.

* cited by examiner receiving configuration
information on CHO                301 transmitting time information of
CHO in response to at least one
failure happens during a CHO
procedure                         302

FIG. 11

METHOD AND APPARATUS FOR REPORTING TIME INFORMATION OF CHO

CROSS-REFERENCE TO RELATED APPLICATIONS

The present application is a U.S. National Stage of International Patent Application No. PCT/CN2020/104915 filed Jul. 27, 2020, the entire content of which is incorporated herein by reference.

TECHNICAL FIELD

Embodiments of the present application generally relate to wireless communication technology, especially to a method and apparatus for reporting time information of conditional handover (CHO).

BACKGROUND

The ability to perform handovers between cells is a requirement of any cellular network. Mobility removes location-based anchors, improves the user experience, and reduces hardware installation constraints. However, providing a quality mobility service traditionally relies on the calibration and configuration of mobility parameters by the network operator. In order to reduce network configuration efforts and to allow the network to adapt to changing environments, the concept of self-optimizing network (SON) has been introduced in the 3GPP protocols.

In the context of SON, mobility robustness optimization (MRO) refers to a category of procedures that allow cellular networks to select their own set of optimal mobility parameters. Such procedures are to be run autonomously and without human intervention in either a centralized or de-centralized manner across the network.

5G MRO as one of SON features is introduced in release 16 (R16). One of the functions of MRO is to detect connection failures that occur due to too early or too late handovers, or handover to wrong Cell. These problems are defined as follows in R16:

[Intra-system Too Late Handover] A radio link failure (RLF) occurs after a user equipment (UE) has stayed for a long period of time in the cell; the UE attempts to re-establish the radio link connection in a different cell.

[Intra-system Too Early Handover] An RLF occurs shortly after a successful handover from a source cell to a target cell or a handover failure occurs during the handover procedure; the UE attempts to re-establish the radio link connection in the source cell.

[Intra-system Handover to Wrong Cell] An RLF occurs shortly after a successful handover from a source cell to a target cell or a handover failure occurs during the handover procedure; the UE attempts to re-establish the radio link connection in a cell other than the source cell and the target cell.

In MRO for traditional handover, UE reported time (or UE reported time information) is used. The "UE reported time" indicates the time elapsed since the last handover initialisation until connection failure. Two kinds of the UE reported time are reported from the UE to the network in RLF-Report:

UE Reported Time/TimeConnFailure:

This IE is used to indicate the time elapsed since the last HO initialization until connection failure.

In the case of handover failure, T304 expiry (Reconfiguration with sync Failure), the UE shall set the time- ConnFailure to the elapsed time since reception of the last RRCReconfiguration message including the reconfigurationWithSync In the case of detection of radio link failure, the UE shall set the timeConnFailure to the elapsed time since reception of the last RRCReconfiguration message including the reconfigurationWithSync TimeSinceFailure:

This field is used to indicate the time that elapsed since the connection (establishment) failure.

When UE initiating the reporting RLF-Report, the UE shall set timeSinceFallure to the time that elapsed since the last radio link or handover failure in NR.

The UE reported time is used for MRO detection mechanism as follows:

[Intra-system Too Late Handover]: There is no recent handover for the UE prior to the connection failure e.g., the UE reported time is absent or larger than the configured threshold (e.g. Tstore_UE_cntxt)

[Intra-system Too Early Handover]: There is a recent handover for the UE prior to the connection failure e.g., the UE reported time is smaller than the configured threshold (e.g. Tstore_UE_cntxt), and the first re-establishment attempt cell/the cell UE attempts to re-connect is the cell that served the UE at the last handover initialisation.

[Intra-system Handover to Wrong Cell]: There is a recent handover for the UE prior to the connection failure e.g. the UE reported time is smaller than the configured threshold (e.g., Tstore_UE_cntxt), and the first re-establishment attempt cell/the cell UE attempts to re-connect is neither the cell that served the UE at the last handover initialisation nor the cell that served the UE where the RLF happened or the cell that the handover was initialized toward.

SUMMARY OF THE APPLICATION

Embodiments of the present application provide a method and apparatus for reporting time information of CHO.

An embodiment of the present application provides a method. The method may include: receiving configuration information on conditional handover (CHO), and transmitting time information of CHO in response to at least one failure happens during a CHO procedure.

In an embodiment of the present application, the time information of CHO may include at least one of: a first failure time since an event to a CHO failure of the at least one failure, and a second failure time since a CHO failure of the at least one failure.

In an embodiment of the present application, the first failure time may include at least one of: a first time information indicating time elapsed since a first CHO configuration execution initialization until a first CHO failure, a second time information indicating time elapsed since a first CHO configuration evaluation initialization until the first CHO failure, a third time information indicating time elapsed for a first CHO configuration evaluation, a fourth time information indicating time elapsed since the first CHO configuration execution initialization until a second CHO failure, a fifth time information indicating time elapsed since a second CHO configuration execution initialization until the second CHO failure, a sixth time information indicating time elapsed since the first CHO configuration evaluation initialization until a second CHO failure, a seventh time information indicating time elapsed since the first CHO configuration execution initialization until radio link failure after the second CHO success, an eighth time information indicating time elapsed since the second CHO configuration execution initialization until the radio link failure after the second CHO success, a ninth time information indicating time elapsed since the first CHO configuration evaluation initialization until radio link failure after the second CHO success, and a tenth time information indicating time elapsed since a last handover until the radio link failure during the first CHO configuration evaluation.

In an embodiment of the present application, the second failure time may include at least one of: an eleventh time information indicating time elapsed since the first CHO failure, a twelfth time information indicating time elapsed since the radio link failure after the second CHO success, and a thirteenth time information indicating time elapsed since the second CHO failure.

In an embodiment of the present application, the method may further include transmitting cell information associated with CHO. For example, the cell information associated with CHO may include at least one of: triggered cell ID(s), selected cell ID, and cell ID list(s) fulfilling part of or all of a plurality of handover execution conditions for CHO. The cell information associated with CHO may further include cell measurement results. In another example, the cell information associated with CHO may further include at least one of: cell ID list(s) fulfilling part of the plurality of handover execution conditions for CHO, and time information fulfilling part of the plurality of handover execution conditions for CHO.

Another embodiment of the present application provides a method. The method may include: receiving time information of CHO in response to at least one failure happens during a CHO procedure.

In an embodiment of the present application, the time information of CHO may further include multiple time information of CHOs, and a corresponding failed cell ID for each time information of CHO.

In an embodiment of the present application, the method may further include forwarding the time information of CHO to a neighbour node associated with the failed cell ID.

In an embodiment of the present application, the method may further include detecting failure type according to the time information of CHO.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

According to the embodiments of the present application, the UE may send UE reported time information of CHO to the network, so that the network can detect the failure types (such as, too early handover, too late handover or handover to wrong cell) of conditional handover for MRO.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 11 illustrates another CHO procedure at UE side according to an embodiment of the present application;

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Different from traditional handovers, a CHO procedure is defined as a handover procedure that is executed by a UE when one or more handover execution conditions are met. During a CHO procedure, the UE may start evaluating execution condition(s) after receiving CHO configuration information, and stop evaluating the execution condition once the execution condition(s) is met.

The following principles can be applied to CHO:

The CHO configuration contains the configuration of CHO candidate cell(s) generated by the candidate gNB(s) and execution condition(s) generated by the source gNB.

An execution condition may consist of one or two trigger condition(s) (CHO events A3/A5). Only single reference signal (RS) type is supported and at most two different trigger quantities (e.g., reference signal receiving power (RSRP) and reference signal receiving quality (RSRQ), RSRP and interference plus noise ratio (SINR), etc.) can be configured simultaneously for the evaluation of CHO execution condition of a single candidate cell.

Before any CHO execution condition is satisfied, upon reception of handover (HO) command (without CHO configuration), the UE executes the HO procedure, regardless of any previously received CHO configuration.

While executing CHO, i.e., from the time when the UE starts synchronization with target cell, UE does not monitor source cell.

Figure 1:
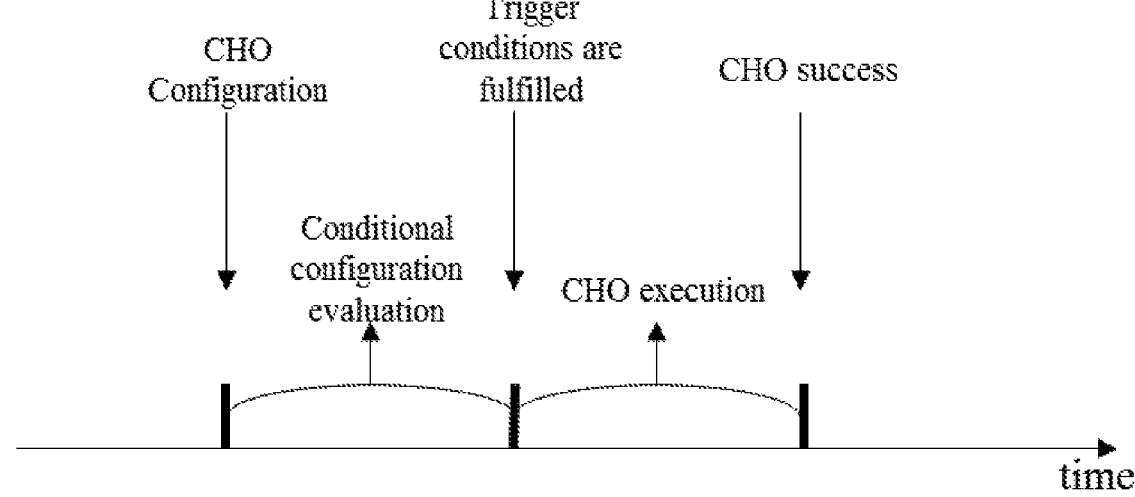
FIG. 1 illustrates a CHO procedure at a UE side according to some embodiments of the present application.

FIG. 1 illustrates a CHO procedure at a UE side in which the CHO succeeds.

As shown in FIG. 1, first, a UE receives configuration information on CHO (also called CHO configuration) from a base station (BS). The CHO configuration contains the configuration of CHO candidate cell(s) and execution condition(s). An execution condition may include one or two trigger condition(s) (e.g., including an A3 event or an A5 event, or including both the A3 and A5 event as specified in 3GPP standard document TS38.331). Second, the UE performs a conditional configuration evaluation, that is, the UE evaluates execution condition(s). Third, when the UE determines the one or more trigger condition(s) are fulfilled, the UE performs a CHO execution. Finally, in this embodiment, the CHO succeeds.

In embodiments of the present application, the BS may also be referred to as an access point, an access terminal, a base, a base unit, a macro cell, a Node-B, an evolved Node B (eNB), a gNB, a Home Node-B, a relay node, or a device, or described using other terminology used in the art. The BS is generally part of a radio access network that may include one or more controllers communicably coupled to one or more corresponding BS(s). The UE may be a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., router, switch, and modem), or the like. According to an embodiment of the present application, the UE may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE may be a wearable device, such as a smart watch, a fitness band, an optical head-mounted display, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
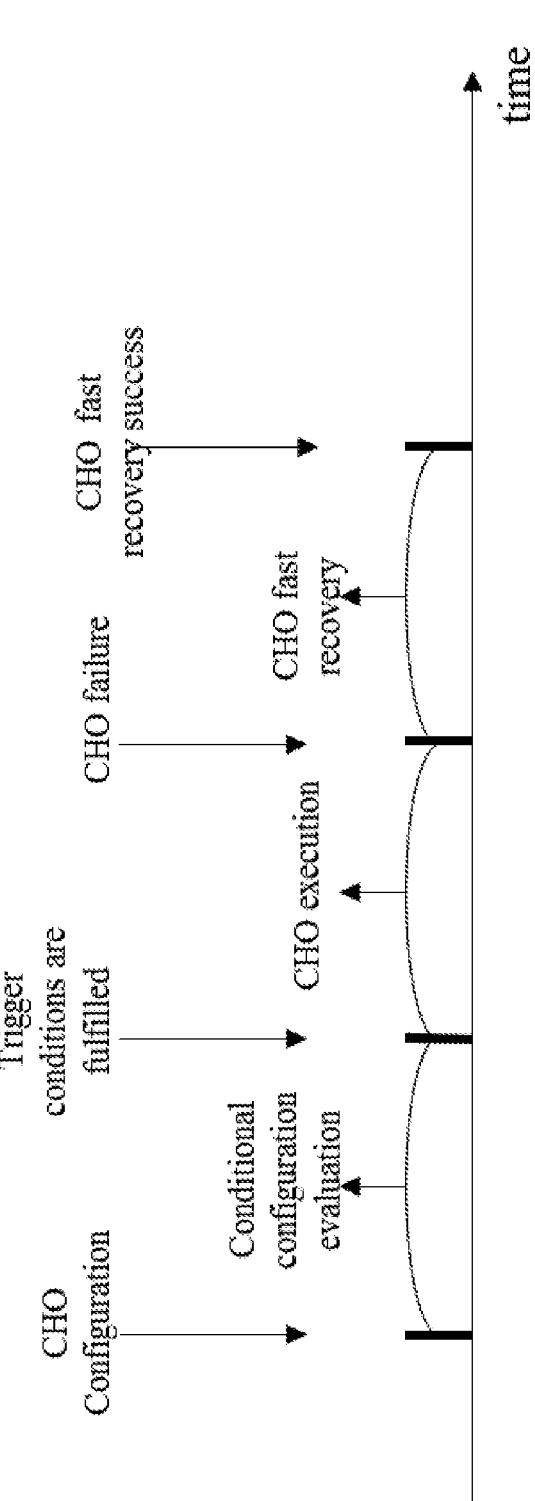
FIG. 2 illustrates another CHO procedure at a UE side according to some embodiments of the present application.

FIG. 2 illustrates another CHO procedure at a UE side in which a CHO failure happens and then a CHO recovery succeeds.

3GPP RAN2 has agreed that a new recovery procedure for a RLF, a HO failure, or a CHO failure. As shown in FIG. 2, when an initial CHO execution attempt fails or HO fails ("CHO failure" as shown in FIG. 2), the UE may perform a cell selection. If the selected cell is a CHO candidate and if the network configured the UE to try CHO after an HO failure or CHO failure, then the UE attempts CHO execution once more ("CHO fast recovery" as shown in FIG. 2); otherwise, a re-establishment procedure is performed. In the embodiment shown in FIG. 2, the CHO fast recovery succeeds.

As discussed in MRO, the UE reported time is very important for failure type detection (for example, too early handover, too late handover and handover to wrong cell). However, the existing UE reported time is defined for the traditional handover, and it is not appropriate for CHO. In some embodiments of the present application, the UE reported time is re-defined for CHO cases, so that the network can detect the failure types more accurate in the case of CHO.

Figure 3:
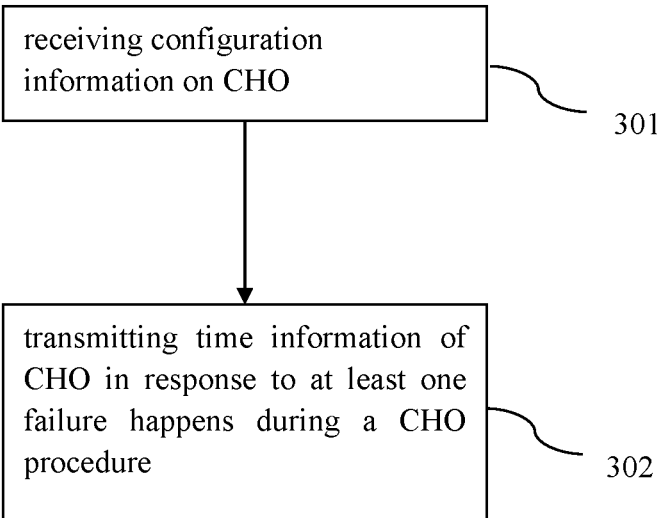
FIG. 3 illustrates a flow chart of a method for reporting time of CHO according to some embodiments of the present application.

FIG. 3 illustrates a flow chart of a method for reporting time information of CHO according to some embodiments of the present application. The method in FIG. 3 may be performed by a UE.

As shown in FIG. 3, in step 301, the UE may receive configuration information on CHO from a BS (e.g., a source BS). For example, the CHO configuration information may include the configuration of CHO candidate cell(s) generated by the candidate BSs and execution condition(s) generated by the source BS.

The execution condition(s) may include one or two trigger conditions. For example, in the case that the execution condition includes one trigger condition, the trigger condition may be an A3 event or an A5 event as specified in 3GPP standard document TS38.331. In the case that the execution conditions include two trigger conditions, the two trigger conditions may be an A3 event and an A5 event as specified in 3GPP standard document TS38.331. In addition, only a single reference signal (RS) type may be used for evaluating the execution condition of a single cell and at most two different execution quantities can be configured simultaneously for evaluating the execution condition of a single cell. For example, the two different execution quantities may be RSRP and RSRQ, or RSRP and SINR, or the like.

In step 302, the UE may transmit time information of CHO in response to at least one failure happens during a CHO procedure. In some embodiments of the present application, the time information of CHO may include two kinds of failure time information, the first one is the failure time since an event to a CHO failure (which may be referred to as "UE reported time" similar to that in current protocols), and the second one is the failure time since a CHO failure (which may be referred to as time since failure).

The following will describe the method for reporting time of CHO in detail in conjunction with the embodiments of the present application.

Figure 4:
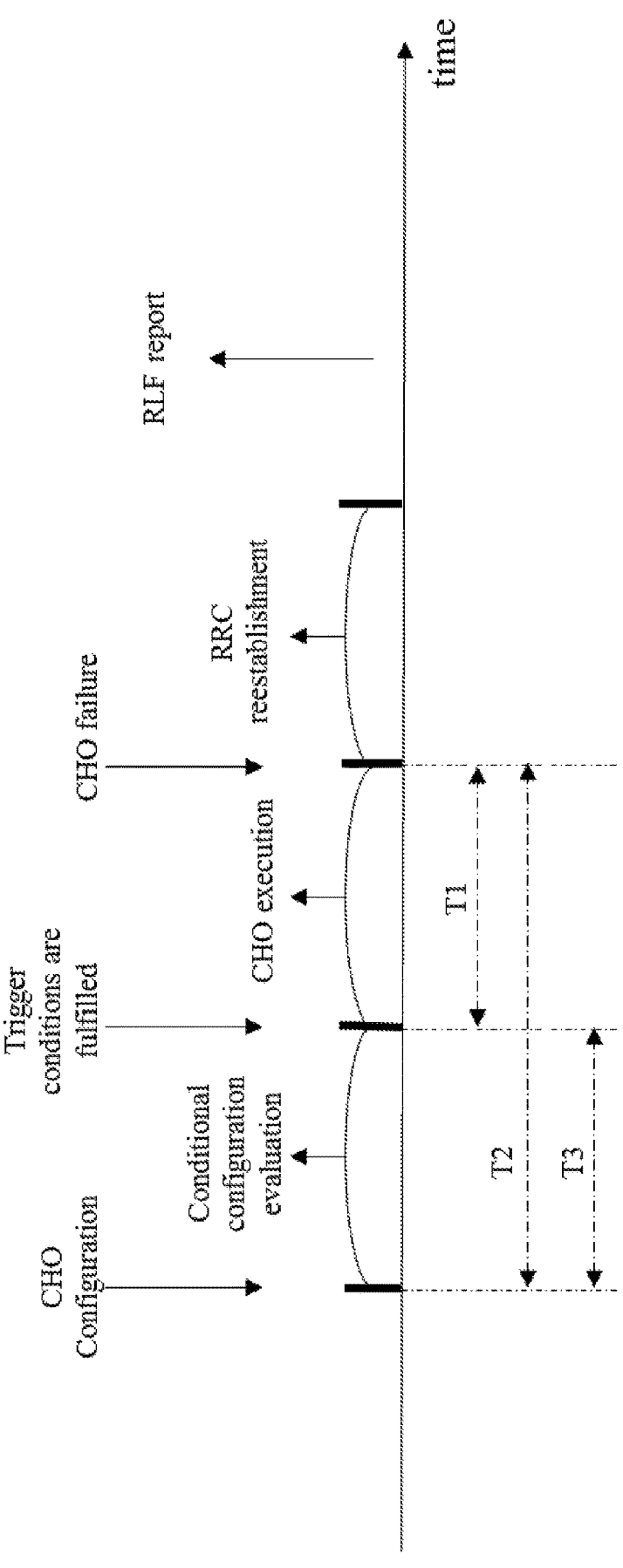
FIG. 4 illustrates a CHO procedure at UE side according to an embodiment of the present application.

FIG. 4 illustrates a CHO procedure at the UE side according to an embodiment of the present application.

In this embodiment, CHO is configured for the UE, an initial CHO is executed at the UE but fails, while the network (such as a BS) did not configure the UE to try a CHO again after an initial HO failure or CHO failure.

As shown in FIG. 4, first, the UE receives CHO configuration information (or CHO configuration). The CHO configuration may include the configuration of CHO candidate target cell(s) generated by the candidate BSs and execution condition(s) generated by the source BS. For example, the network configures the UE with one or more candidate target cells in the CHO configuration. The network may provide the configuration parameters for the candidate target cells, e.g., in the ConditionalReconfiguration IE. Thus, the UE may use the configuration parameters to perform a handover to one of the target cells.

Second, the UE performs a conditional configuration evaluation. For example, after receiving the CHO configuration from the network, the UE performs a conditional configuration evaluation. The execution condition(s) may include one or two trigger condition(s) (such as, only A3 event, only A5 event, or both A3 and A5 event). If the UE determines that all the trigger conditions are fulfilled, the UE will consider the target candidate cell as a triggered cell and initiate the CHO configuration execution.

Third, the UE performs the CHO configuration execution (that is, "CHO execution" in FIG. 4). For example, if more than one triggered cell exists, the UE will select one of the existing triggered cells as the selected cell for the CHO configuration execution. The UE will apply the configuration parameters for the selected cell and access to the target cell. However, in this embodiment, the CHO fails, that is a CHO failure occurs (e.g., T304 expiry).

In this embodiment, the network did not configure the UE to try CHO after a CHO failure (such as, attemptCondReconfig is not configured). In response to the CHO failure, the UE may perform a reestablishment. For example, the UE may perform a normal radio resource control (RRC) Connection Re-establishment procedure ("RRC reestablishment" as shown in FIG. 4).

After the RRC connection reestablishment, the UE may send a RLF report, e.g., via RLF-Report IE to the network. The RLF-Report IE may include one or more of the following UE reported time (failure time since an event to a CHO failure) so that the network can detect the failure types more accurate in the case of CHO:

UE Reported Time 1 (also called first time information, "T1" in FIG. 4): indicating time elapsed since a first CHO configuration execution initialization until a CHO failure (that is, the first CHO failure). The first CHO configuration execution initialization is performed when a cell is selected for CHO configuration execution or all trigger conditions of the cell is fulfilled or a timer as the first T304 starts. The first CHO failure may correspond to the first T304 expiry;

UE Reported Time 2 (also called second time information, "T2" in FIG. 4): indicating time elapsed since a first conditional configuration evaluation initialization until the first CHO failure. The first conditional configuration evaluation initialization is performed upon receiving the CHO configuration;

UE Reported Time 3 (also called third time information, "T3" in FIG. 4): indicating time elapsed for the first conditional configuration evaluation. The first conditional configuration evaluation is performed from receiving the CHO configuration to a cell being selected for CHO configuration execution or all trigger conditions of the cell being fulfilled or the first T304 starts.

An exemplary application scenario may be as described here. For example, the UE has a contiguous coverage from gNB1 (such as, Cell A), but the UE determines to perform a CHO to gNB2 (such as, the Cell B). That is, the serving cell of the UE before the CHO is Cell A of gNB1 and the target cell selected by the UE is Cell B of gNB2. However, as the UE exits the coverage region of Cell B, a CHO failure occurs and the UE has to reconnect to gNB1 (the Cell A).

The UE may send a RLF report including the above one or more UE reported time (that is, T1, T2, and T3) with the selected or failed cell information (including the Cell ID e.g., new radio (NR) cell group ID (NCGI) of the selected or failed cell) to gNB1. Based on the selected cell information, gNB1 forwards the RLF report including the above UE reported time to gNB2. In an example, if the UE reported time is less than a corresponding configured threshold (e.g., Tstore_UE_cntxt), gNB2 decides that too early CHO occurred. gNB2 may send a handover report message with too early CHO indication to gNB1.

Figure 5:
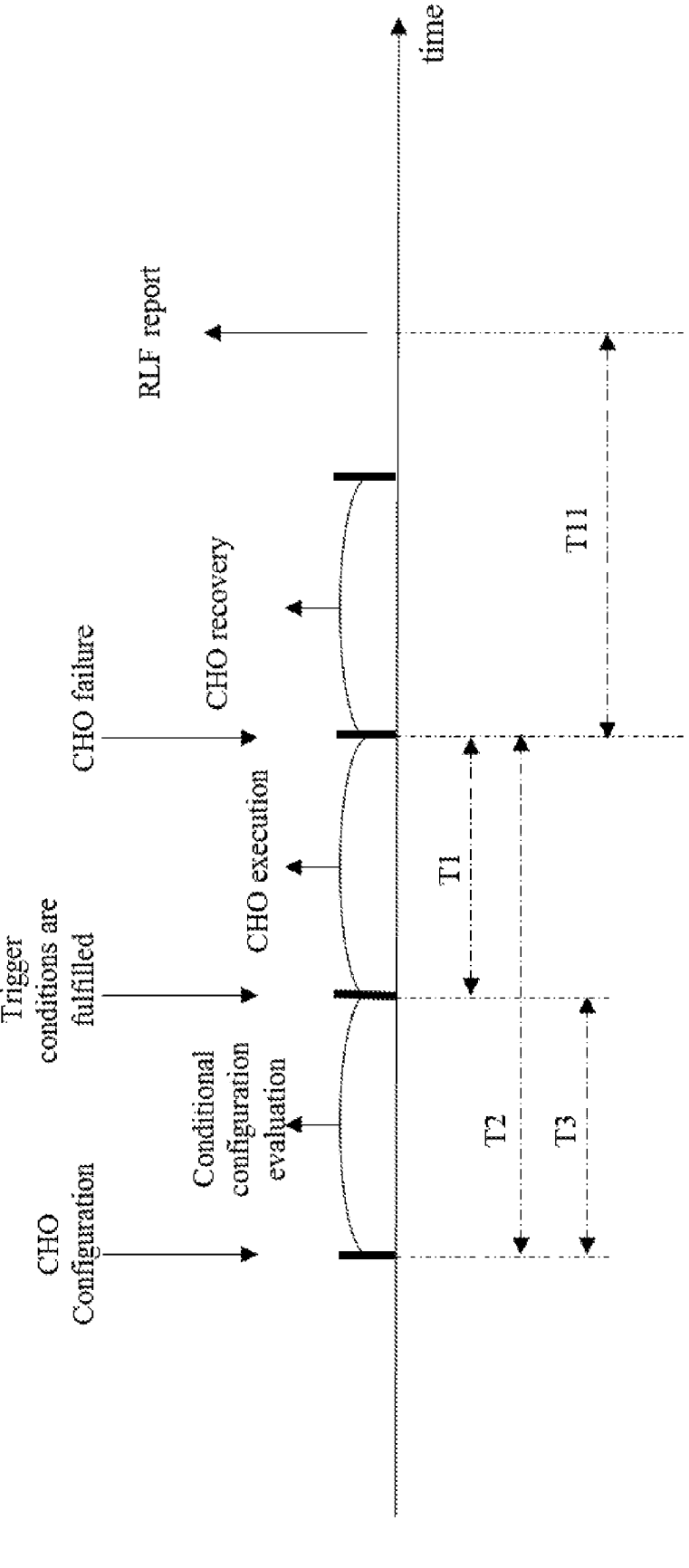
FIG. 5 illustrates another CHO procedure at UE side according to an embodiment of the present application.

FIG. 5 illustrates another CHO procedure at the UE side according to an embodiment of the present application.

In this embodiment, CHO is configured for the UE. Meanwhile, the UE is configured to try a CHO again after an initial CHO execution fails, for example attemptCondReconfig being configured.

As shown in FIG. 5, the operations for receiving CHO configuration, conditional configuration evaluation, CHO execution are as the same as those in FIG. 4, which will not be described in detail for simplicity.

In FIG. 5, during the initial CHO execution, the CHO fails, that is a CHO failure occurs, e.g. T304 expiry. Since the UE is configured to try a CHO again after an initial HO failure or CHO failure. That is, attemptCondReconfig is configured, the UE will attempt a CHO execution again (which is also called a second CHO, "CHO recovery" as shown in FIG. 5).

In this embodiment, the second CHO succeeds. After that, the UE may send a RLF report (such as via RLF-Report IE) to the network. The RLF Report IE may include one or more of the following UE reported time (failure time since an event to a CHO failure), so that the network can detect the failure types more accurate in the case of CHO:

UE Reported Time 1 (also called first time information, "T1" in FIG. 5): indicating time elapsed since a first CHO configuration execution initialization until a CHO failure (the first CHO failure). The first CHO configuration execution initialization is performed when a cell being selected for CHO configuration execution or all trigger conditions of the cell being fulfilled or the first T304 starts. The first CHO failure may correspond to the first T304 expiry.

UE Reported Time 2 (also called second time information, "T2" in FIG. 5): indicating time elapsed since a first conditional configuration evaluation initialization until the first CHO failure. The first conditional configuration evaluation initialization is performed upon receiving CHO configuration.

UE Reported Time 3 (also called third time information, "T3" in FIG. 5): indicating time elapsed for the first conditional configuration evaluation. The first conditional configuration evaluation is performed from receiving the CHO configuration to a cell being selected for CHO configuration execution or all trigger conditions of the cell being fulfilled or a second T304 starts.

The UE may also report the time since failure in the RLF-report to network:

Time Since failure 1 (also called eleventh time information, "T11" in FIG. 5): indicating the time elapsed since the first CHO failure.

An exemplary scenario may be as described here. For example, the serving cell for the UE before a CHO is Cell A of gNB1, the target cell firstly selected by the UE is Cell B of gNB2, and the cell for a second CHO execution is Cell C of gNB3. As the UE exits the region of coverage of Cell B of the gNB2, a CHO failure occurs, and the UE connects to gNB3 (Cell C).

Figure 6:
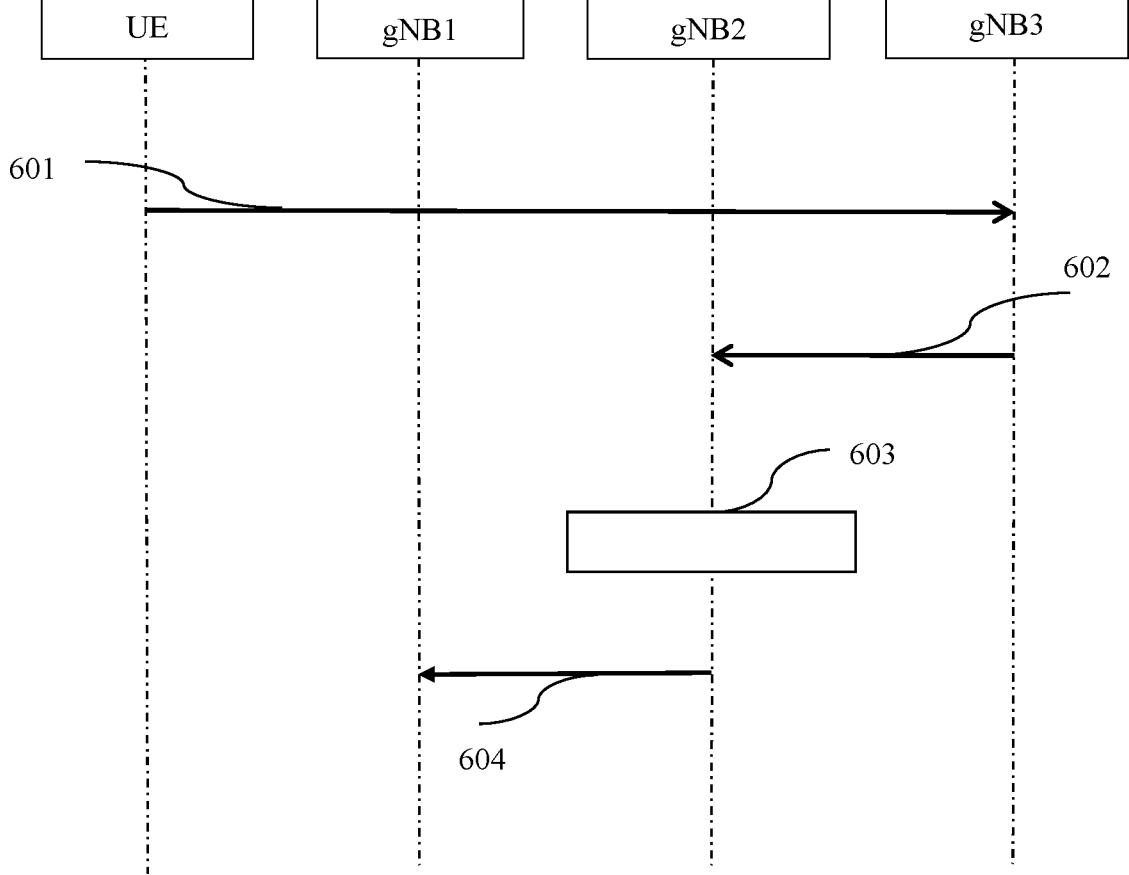
FIG. 6 illustrates a diagram for reporting the time formation of CHO in view of FIG. 5 and an exemplary scenario according to an embodiment of the present application.

FIG. 6 illustrates a diagram for reporting the time formation of CHO in view of FIG. 5 and the above exemplary scenario according to an embodiment of the present application.

In step 601, the UE may send a RLF report including the above one or more UE reported time (T1, T2, T3) and the time (T11) since failure regarding the CHO failure with the failure cell information (including the Cell ID e.g., NCGI) to gNB3.

In step 602, based on the failure cell information, gNB3 forwards the RLF report including the above UE reported time and the time since failure regarding the CHO failure to gNB2.

In step 603, after receiving the UE reported time from gNB3, gNB2 may determine failure type(s) according to the received UE reported time. In an example, if the UE reported time is less than a corresponding configured threshold (e.g., Tstore_UE_cntxt), gNB2 determines that too early CHO occurred. In another example, if the UE reported time is larger than a corresponding configured threshold (e.g., Tstore_UE_cntxt), the gNB2 determines that too late CHO from Cell A of gNB1 to Cell B of gNB 2 occurred.

In step 604, gNB2 may send a handover report message with the determined failure type (such as, a failure type indication) to gNB1.

Figure 7:
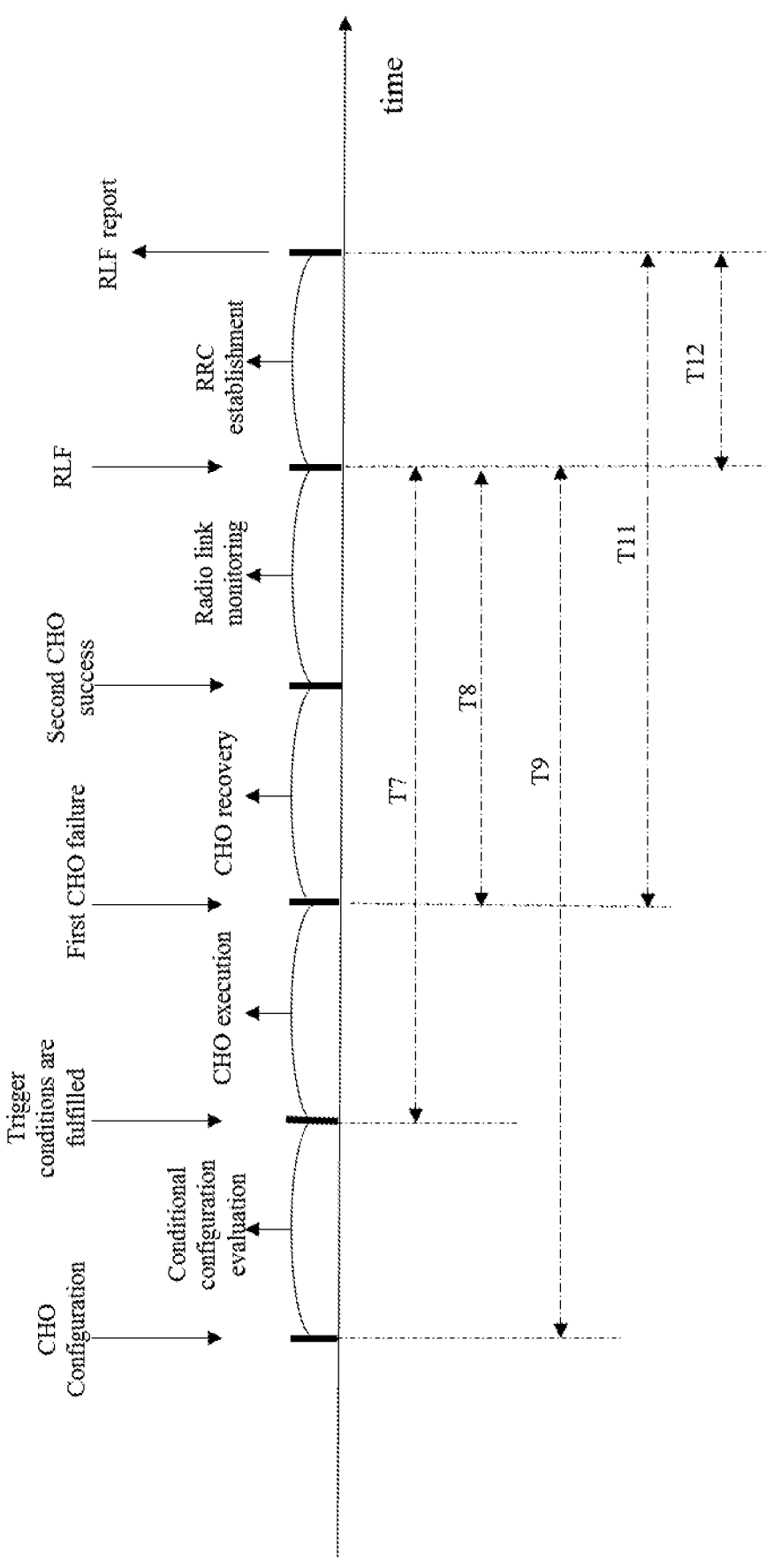
FIG. 7 illustrates another CHO procedure at UE side according to an embodiment of the present application.

FIG. 7 illustrates another CHO procedure at the UE side according to an embodiment of the present application.

In this embodiment, CHO is configured for the UE. Meanwhile, the UE is configured to try a CHO again after an initial CHO execution fails, for example attemptCondReconfig being configured. Although the second CHO succeeded, a RLF occursoccurs after the second CHO.

As shown in FIG. 7, the operations for receiving CHO configuration, conditional configuration evaluation, CHO execution are as the same as those in FIG. 4, which will not be described in detail for simplicity.

In FIG. 7, during the initial CHO execution, the initial CHO fails, that is, an initial (or first) failure occurs (e.g., T304 expiry). In this embodiment, since attemptCondReconfig is configured, the UE will attempt a CHO execution again (which is also called a second CHO, "CHO recovery" as shown in FIG. 7).

However, after the second CHO succeeded, a RLF may happen.

After the RLF is detected, the UE may perform a normal RRC Connection Re-establishment procedure ("RRC establishment" as shown in FIG. 7).

After the normal RRC Connection Re-establishment procedure, the UE may send a RLF report (such as RLF-Report IE) to the network. Besides the above T1, T2, and T3, the RLF-Report IE may further include one or more of the following UE reported time (failure time since an event to a CHO failure), so that the network can detect the failure types more accurate in the case of CHO:

UE Reported Time 7 (also called seventh time information, "T7" in FIG. 7): indicating time elapsed since the first CHO configuration execution initialization until radio link failure after the second CHO success. The first CHO configuration execution initialization is performed when a cell being selected for CHO configuration execution or all trigger conditions of the cell being fulfilled or the first T304 starts.

UE Reported Time 8 (also called eighth time information, "T8" in FIG. 7): indicating time elapsed since the second CHO configuration execution initialization until the radio link failure after the second CHO succeeds. The second CHO configuration execution initialization is performed when a cell being selected for CHO configuration execution/or for fast recovery, or all trigger conditions of the cell being fulfilled in second CHO phase or the second T304 starts. That is, the second CHO configuration execution initialization is performed when the selected cell is a CHO candidate during a cell selection procedure after the first CHO fails.

UE Reported Time 9 (also called ninth time information, represented "T9" in FIG. 7): indicating time elapsed since the first conditional configuration evaluation initialization until radio link failure after a second CHO success.

The UE may also report the time since failure in the RLF-report to network:

Time Since failure 1 (also called eleventh time information, "T11" in FIG. 5): indicating the time elapsed since the first CHO failure.

Time Since failure 2 (also called twelfth time information, "T12" in FIG. 7): indicating the time elapsed since the radio link failure after the second CHO succeeds.

An exemplary scenario may be as described here. For example, the serving cell for the UE before a CHO is Cell A of gNB1, the initial (first) target cell selected by the UE in the first CHO is Cell B of gNB2, the cell for a second CHO is Cell C of gNB3, and the UE reconnects to gNB 4 (Cell D).

Figure 8:
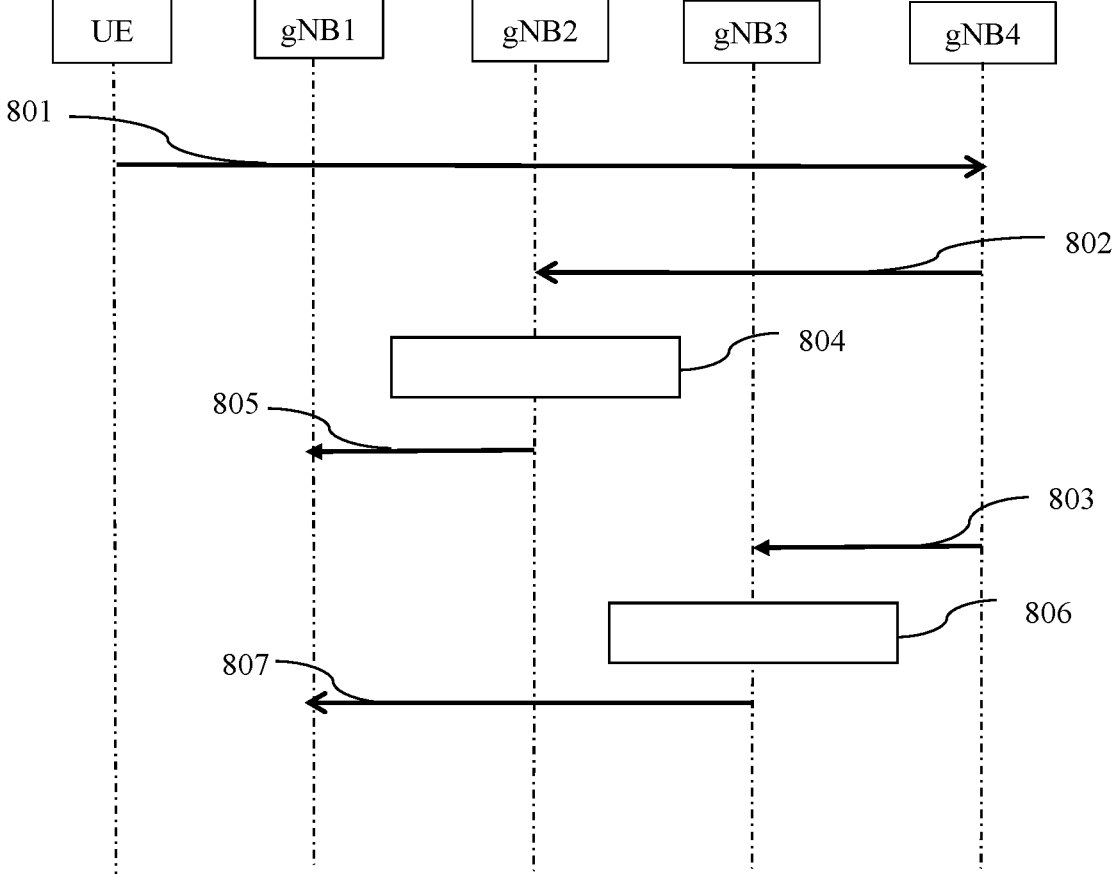
FIG. 8 illustrates a diagram for reporting the time formation of CHO in view of FIG. 7 and an exemplary scenario according to an embodiment of the present application.

FIG. 8 illustrates a diagram for reporting the time formation of CHO in view of FIG. 7 and the above exemplary scenario according to an embodiment of the present application.

In step 801, the UE may send two RLF reports to gNB4. For example, RLF-Report 1 may include one or more above UE reported time (e.g., T1, T2, T3) and the time since failure (T11) regarding the first CHO failure with the first CHO failure cell information (first failed cell ID, e.g., NCGI). RLF-Report 2 may include one or more above UE reported time (T7, T8, T9) and the time since failure (T12) regarding the second CHO failure with the RLF cell information (second failed cell ID, e.g. NCGI).

In step 802, based on the first CHO failure cell information, gNB4 forwards RLF-Report 1 including the one or more the above UE reported time and the time since failure regarding the first CHO failure to gNB2. Similarly, in step 803, based on the RLF cell information, gNB4 forwards RLF-Report 2 including the one or more the above UE reported time and the time since failure regarding the second CHO failure to gNB3.

In step 804, after receiving RLF-Report 1, gNB2 may determine failure type(s) according to the received UE reported time regarding the first CHO failure. In an example, if the UE reported time is less than a corresponding configured threshold (e.g. Tstore_UE_cntxt), gNB2 determines that too early CHO occurred. In another example, if the UE reported time is larger than a corresponding configured threshold (e.g. Tstore_UE_cntxt), gNB2 determines that too late CHO happened.

In step 805, gNB2 may send a handover report message with the determined failure type (such as, a failure type indication) to gNB1.

Similarly, in step 806, after receiving RLF-Report 2, gNB3 may determine failure type(s) according to the received UE reported time regarding the second CHO failure. In step 807, gNB3 may send a handover report message with the determined failure type (such as, a failure type indication) to gNB1.

In the above embodiment in FIG. 8, the two RLF reports, i.e., RLF-Report 1 and RLF-Report 2 are transmitted to gNB4, and gNB4 forwards RLF-Report 1 and RLF-Report 2 to gNB2 and gNB3, independently. In another embodiment, the UE may transmit one RLF report including all time information in RLF-Report 1 and RLF-Report 2 to gNB4, and gNB4 forwards the RLF report including all the information to gNB2 and gNB3. gNB2 may select the time information related to itself (the time information regarding the first CHO failure) and further determine the failure type(s) based on the selected time information. Similar operations can be performed by gNB3.

Figure 9:
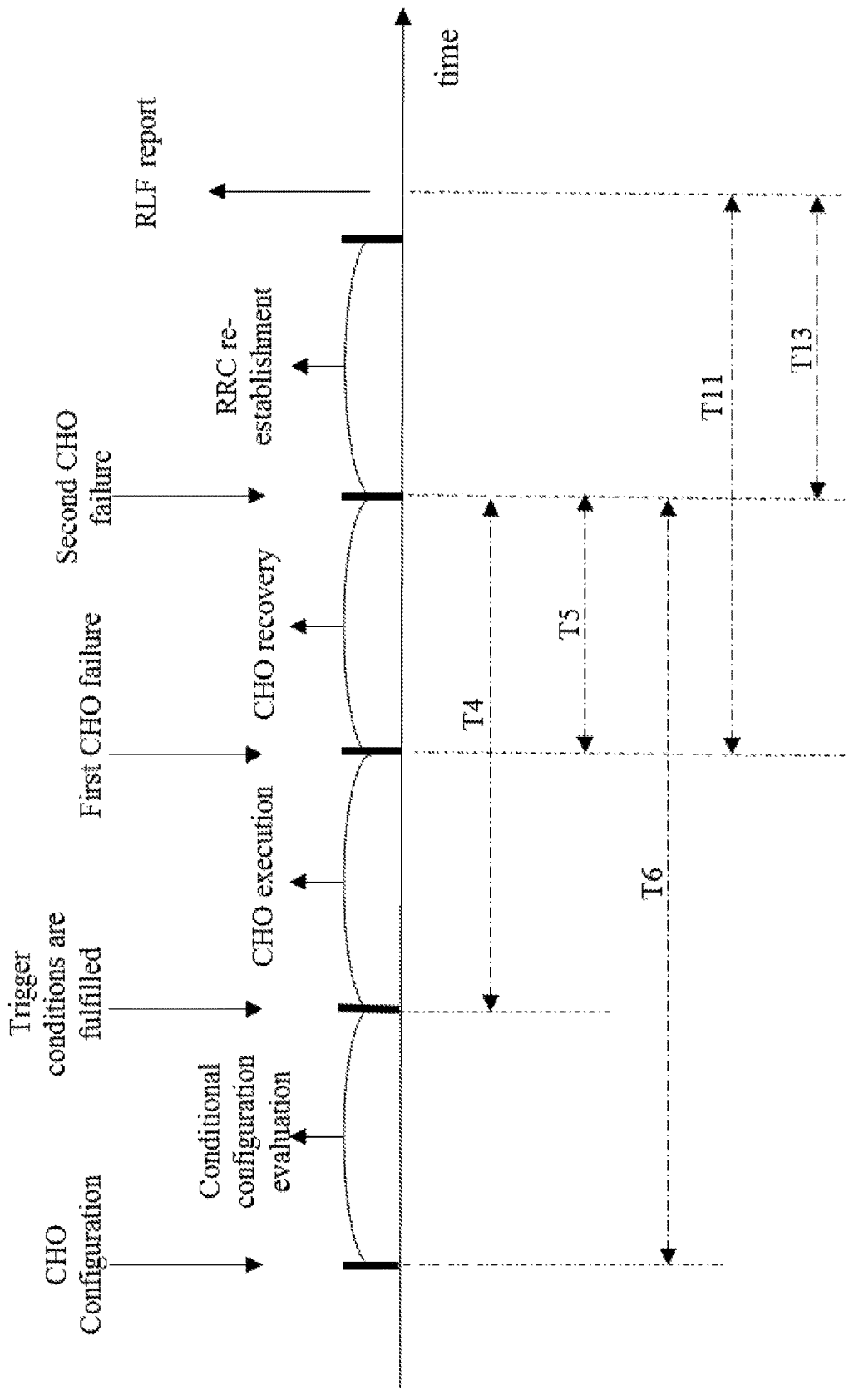
FIG. 9 illustrates another CHO procedure at UE side according to an embodiment of the present application.

FIG. 9 illustrates another CHO procedure at the UE side according to an embodiment of the present application.

In this embodiment, CHO is configured for the UE. Meanwhile, the UE is configured to try a CHO again after an initial CHO execution fails, for example attemptCondReconfig being configured. However, the second CHO also fails.

As shown in FIG. 9, the operations for receiving the CHO configuration, the conditional configuration evaluation, and the CHO execution are as the same as those in FIG. 4, which will not be described in detail for simplicity.

In FIG. 9, during the initial CHO execution, the CHO fails, that is a CHO failure occurs (e.g., the first T304 expiry). In this embodiment, since attemptCondReconfig is configured, the UE will attempt a CHO execution again (which is also called a second CHO, "CHO recovery" as shown in FIG. 9). However, the second CHO fails (e.g., the second T304 expiry).

In response to the second CHO failure, the UE may perform a normal RRC Connection Re-establishment procedure ("RRC re-establishment" as shown in FIG. 9).

After the normal RRC Connection Re-establishment procedure, the UE may send a RLF report (such as via RLF-Report IE) to the network. Besides the above T1, T2, and T3, the RLF Report IE may further include one or more of the following UE reported time (failure time since an event to a CHO failure), so that the network can detect the failure types more accurate in the case of CHO:

UE Reported Time 4 (also called fourth time information, "T4" in FIG. 9): indicating time elapsed since the first CHO configuration execution initialization until a second CHO failure. The first CHO configuration execution initialization is performed when a cell being selected for CHO configuration execution or all trigger conditions of the cell being fulfilled or the first T304 starts.

UE Reported Time 5 (also called fifth time information, "T5" in FIG. 9): indicating time elapsed since a second CHO configuration execution initialization until the second CHO failure. The second CHO configuration execution initialization is performed when a cell being selected for CHO configuration execution/or for fast recovery, or all trigger conditions of the cell being fulfilled in second CHO phase or the second T304 starts. That is, the second CHO configuration execution initialization is performed when the selected cell is a CHO candidate during a cell selection procedure after the first CHO fails.

UE Reported Time 6 (also called sixth time information, "T6" in FIG. 9): indicating time elapsed since the first CHO configuration evaluation initialization until a second CHO failure (e.g., the second T304 expiry).

The UE may also report the time since failure in the RLF-report to network:

Time Since failure 1 (also called eleventh time information, "T11" in FIG. 9): indicating the time elapsed since the first CHO failure (e.g., the first T304 expiry).

Time Since failure 3 (also called thirteenth time information, "T13" in FIG. 9): indicating the time elapsed since the second CHO failure (e.g., the second T304 expiry).

An exemplary scenario may be as described here. For example, the serving cell for the UE before a CHO is Cell A of gNB1, the target cell selected by the UE in the first CHO is Cell B of gNB2, the cell for a second CHO is Cell C of gNB3, and the UE reconnects to gNB 4 (Cell D) due to a second CHO failure.

Figure 10:
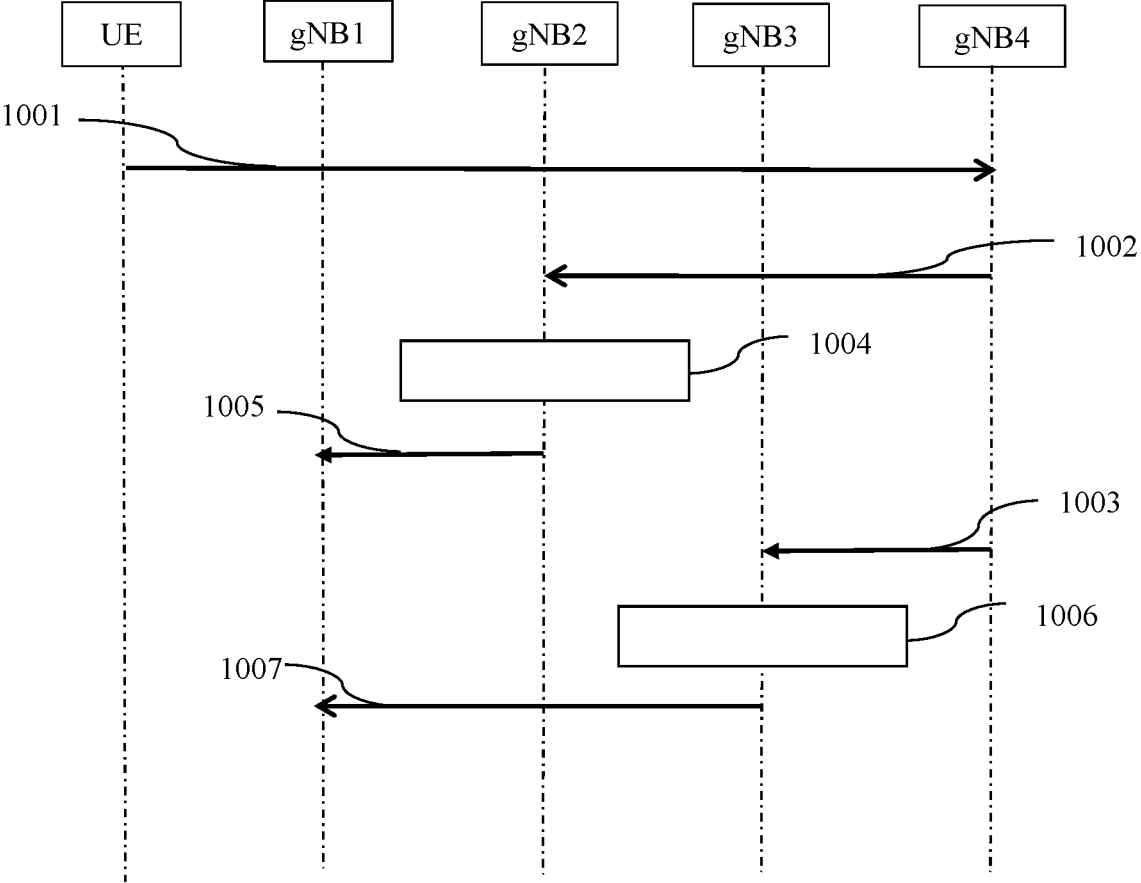
FIG. 10 illustrates a diagram for reporting the time formation of CHO in view of FIG. 9 and an exemplary scenario according to an embodiment of the present application.

FIG. 10 illustrates a diagram for reporting the time formation of CHO in view of FIG. 9 and the above exemplary scenario according to an embodiment of the present application.

In step 1001, the UE may send two RLF reports, i.e., RLF-Report 1 and RLF-Report 2 o gNB4. RLF-Report 1 including one or more above UE reported time (T1, T2, T3) and the time since failure (T11) regarding the first CHO failure with the first CHO failure cell information (including the first failed cell ID, e.g., NCGI). RLF-Report 2 including one or more the above UE reported time (T4, T5, T6) and the time since failure (T13) regarding the second CHO failure with the RLF cell information (including the second failed cell ID, e.g. NCGI).

In step 1002, based on the first CHO failure cell information, gNB4 forwards the RLF-Report 1 including the one or more above UE reported time and the time since failure regarding the first CHO failure to gNB2. Similarly, in step 1003, based on the RLF cell information, gNB4 forwards RLF-Report 2 including the one or more above UE reported time and the time since failure regarding the second CHO failure to gNB3.

Operations of steps 1003-1007 in FIG. 10 are similar to those of steps 803-807 in FIG. 8, which will not be described in detail for simplicity.

In the above embodiment in FIG. 10, the two RLF reports including RLF-Report 1 and the RLF-Report 2 are transmitted to gNB4, and gNB4 forwards RLF-Report 1 and RLF-Report 2 to gNB2 and gNB3, independently. In another embodiment, the UE may transmit one RLF report including all time information in the RLF-Report 1 and the RLF-Report 2 to gNB4, and gNB4 forwards the RLF report including all the time information to gNB2 and gNB3. gNB2 may select the time information related to itself (the time information regarding the first CHO failure) and further determine the failure type(s) based on the selected time information. Similar operations Can be performed by gNB3.

Figure 11:
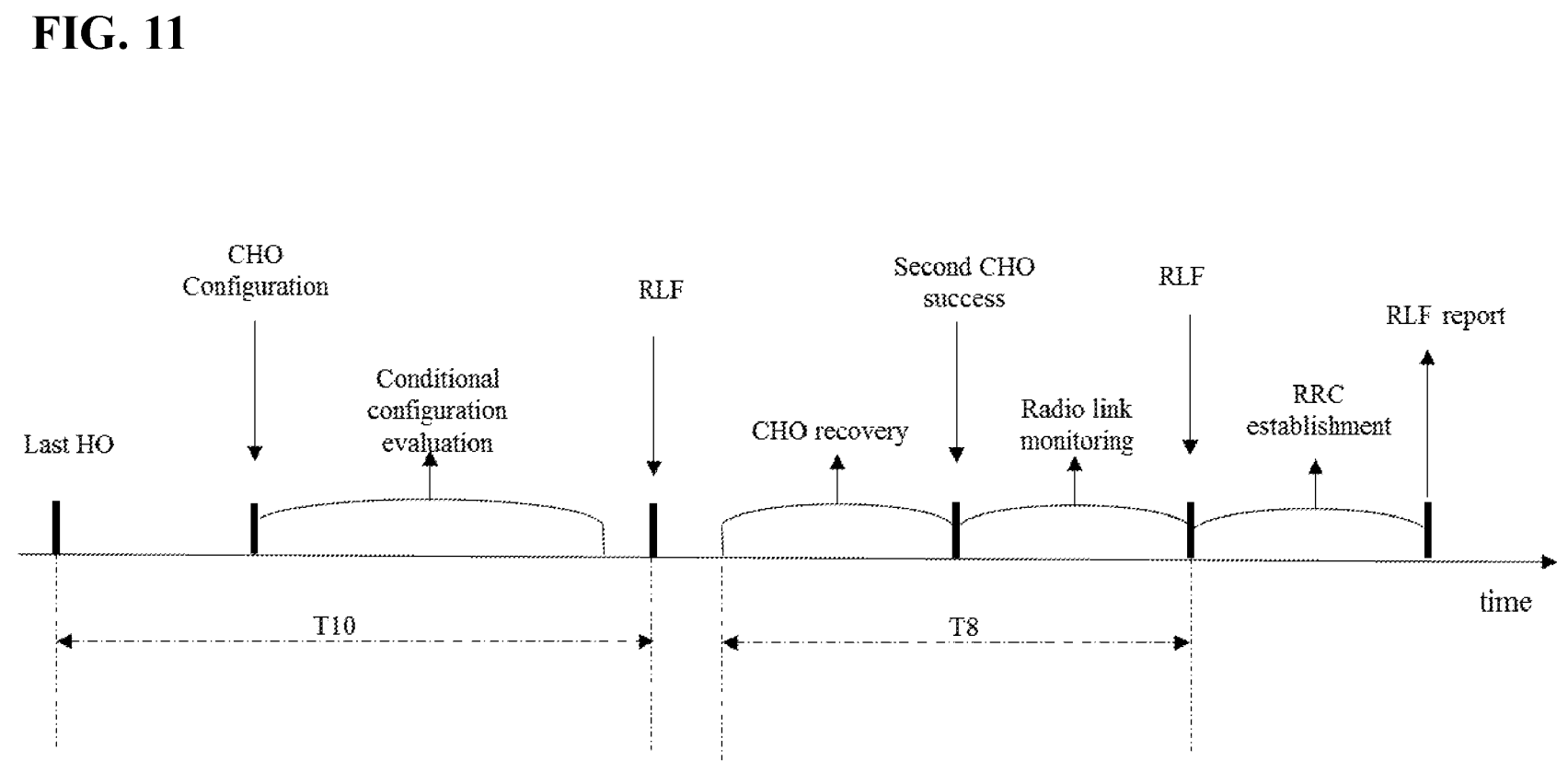

FIG. 11 illustrates another CHO procedure at UE side according to an embodiment of the present application.

In this embodiment, CHO is configured for the UE, a first RLF happens during a conditional configuration evaluation, and the network configured the UE to try a CHO again after a first RLF happens, e.g., attemptCondReconfig being configured. Although the second CHO succeeded, a second RLF happens again after a second CHO.

As shown in FIG. 11, after the last HO, the UE receives CHO configuration. The operation for receiving CHO configuration is the same as that in FIG. 4, which will not be described in detail for simplicity.

The UE may perform a conditional configuration evaluation based on the CHO configuration. During the conditional configuration evaluation, a RLF happens. Since attemptCondReconfig is configured, the UE will attempt a CHO again (which is also called a second CHO, "CHO recovery" as shown in FIG. 11).

After the second CHO succeeds, the UE performs a radio link monitoring and then a RLF happens.

After RLF is detected, the UE will perform a normal RRC Connection establishment procedure ("RRC establishment" as shown in FIG. 11).

After the RRC Connection establishment, the UE may send a RLF report (such as RLF-Report IE) to the network. The RLF-Report IE may include one or more of the following UE reported time (failure time since an event to a CHO failure), so that the network can detect the failure types more accurate in the case of CHO:

UE Reported Time 8 (also called eighth time information, "T8" in FIG. 11): indicating time elapsed since the second CHO configuration execution initialization until the radio link failure after the second CHO succeeds. The second CHO configuration execution initialization is performed when a cell being selected for CHO configuration execution/or for fast recovery, or all trigger conditions of the cell being fulfilled in second CHO phase or the second T304 starts.

UE Reported Time 10 (also called tenth time information, "T10" in FIG. 11): indicating time elapsed since a last handover until the radio link failure during a first conditional configuration evaluation.

An exemplary scenario may be as described here. The serving cell for the UE before a conditional configuration evaluation is Cell A of gNB1, the cell for a CHO recovery is Cell B of gNB2, and the UE reconnects to Cell C of gNB3.

Figure 12:
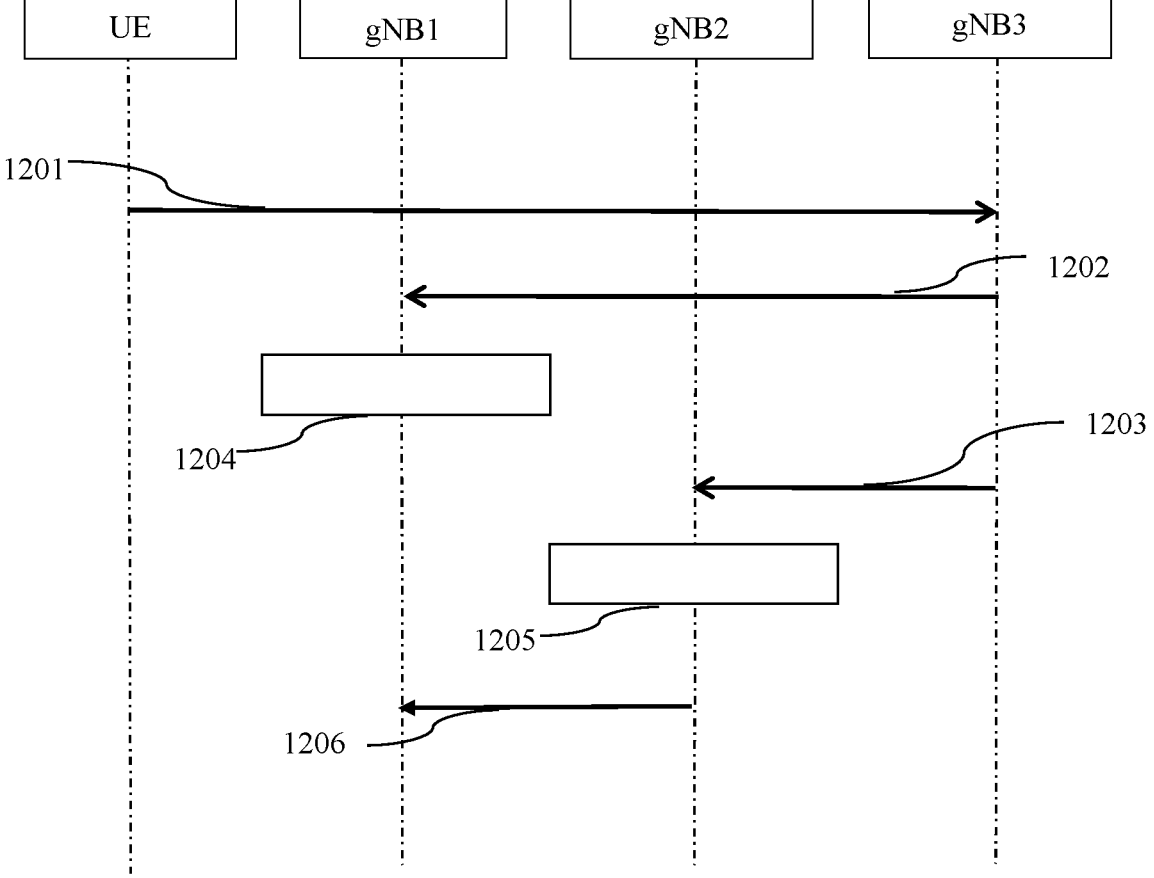
FIG. 12 illustrates a diagram for reporting the time formation of CHO in view of FIG. 11 and an exemplary scenario according to an embodiment of the present application.

FIG. 12 illustrates a diagram for reporting the time formation of CHO in view of FIG. 11 and the exemplary scenario according to an embodiment of the present application.

In step 1201, the UE may send two RLF reports, i.e., RLF-Report 1 and RLF-Report 2 to gNB3. RLF-Report 1 may include the above UE reported time (TS10) regarding the first RLF with the first RLF cell (Cell A) information (including the first failed cell ID, e.g., NCGI). RLF-Report 2 may include the above UE reported time (T8) regarding the second CHO failure with the second RLF cell (Cell B) information (including the second failed cell ID, e.g., NCGI).

In step 1202, based on the first RLF cell (Cell A) information, gNB3 forwards RLF-Report 1 including the above UE reported time regarding the first RLF to gNB1. Similarly, in step 1203, based on the second RLF cell (Cell B) information, gNB3 forwards RLF-Report 2 including the above UE reported time regarding the second CHO failure to gNB2.

In step 1204, after receiving RLF-Report 1, gNB1 may determine failure type(s) according to the received UE reported time regarding the first RLF.

Similarly, in step 1205, after receiving RLF-Report 2, gNB2 may determine failure type(s) according to the received UE reported time regarding the second CHO failure. In step 1206, gNB2 may send a handover report message with the determined failure type (such as, a failure type indication) to gNB1.

In the above embodiment in FIG. 12, the two RLF reports including RLF-Report 1 and RLF-Report 2 are transmitted to gNB3, and gNB3 forwards RLF-Report 1 and RLF-Report 2 to gNB1 and gNB2, independently. In another embodiment, the UE may transmit one RLF report including all time information in RLF-Report 1 and RLF-Report 2 to gNB3, and gNB3 forwards the RLF report including all the time information to gNB1 and gNB2. gNB1 may select the time information related to itself (the time information regarding the first RLF) and further determine the failure type based on the selected time information. Similar operations can be performed by gNB2.

In the embodiments of the present application, the UE may transmit cell information associated with CHO to the network. For example, the cell information associated with CHO may include at least one of: triggered cell ID(s); selected cell ID; and cell ID list(s) fulfilling part of or all of a plurality of handover execution conditions for CHO.

In an example, during conditional configuration evaluation phase, there are possible many cells can fulfill the conditions as specified in TS 38.331:

1> if more than one triggered cell exists:

2> select one of the triggered cells as the selected cell for CHO configuration execution;

In another example, for the above embodiments of the present application, in the RLF-Report IE, the UE may report the selected cell/triggered Cell ID and also the Cell ID Lists (optionally with measurement results) that fulfil the conditions to the network so that the network can detect and analyse the failure problem. If only one of conditions is fulfilled, the UE may also report the partial fulfilled information (partial condition fulfilled cell ID list, condition fulfilled time information, measurement results) to the network.

In the above embodiments of the present application, after a CHO is performed and failure happens, the UE may send the UE Reported time information of CHO to the network, so that the network can detect the failure types (such as, too early handover, too late handover or handover to wrong cell) of conditional handover for MRO.

Figure 13:
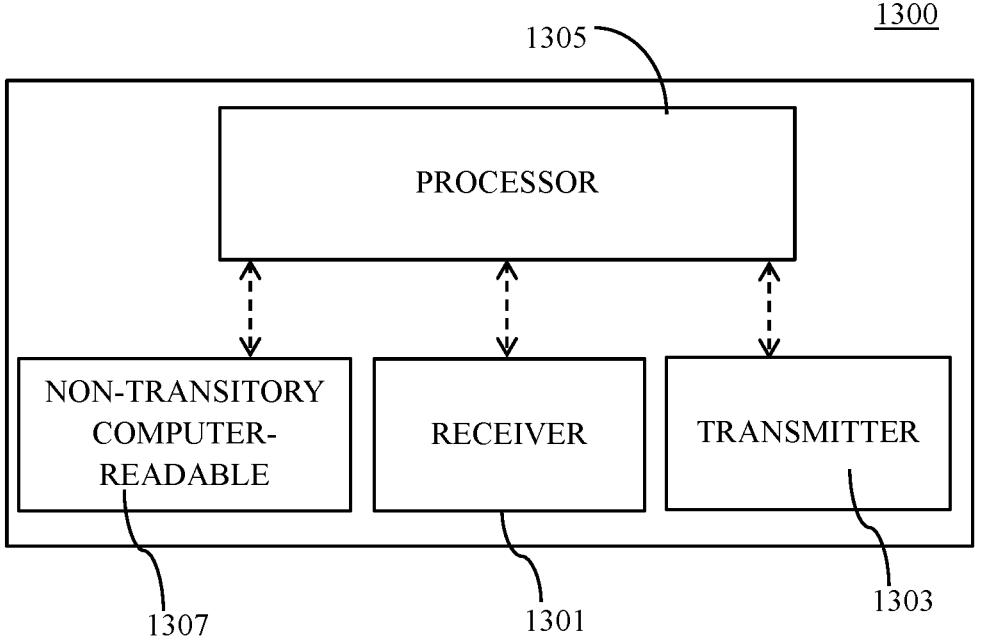
FIG. 13 illustrates an apparatus according to some embodiments of the present application.

FIG. 13 illustrates an apparatus according to some embodiments of the present application. In some embodiments of the present disclosure, the apparatus 1000 may be the UE in the above embodiments of the present application.

As shown in FIG. 13, the apparatus 1300 may include a receiver 1301, a transmitter 1303, a processer 1305, and a non-transitory computer-readable medium 1307. The non-transitory computer-readable medium 1307 has computer executable instructions stored therein. The processer 1305 is configured to be coupled to the non-transitory computer readable medium 1307, the receiver 1301, and the transmitter 1303. It is contemplated that the apparatus 1300 may include more computer-readable mediums, receiver, transmitter and processors in some other embodiments of the present application according to practical requirements. In some embodiments of the present application, the receiver 1301 and the transmitter 1303 are integrated into a single device, such as a transceiver. In certain embodiments, the apparatus 1300 may further include an input device, a memory, and/or other components.

In some embodiments of the present application, the non-transitory computer-readable medium 1307 may have stored thereon computer-executable instructions to cause a processor to implement the method according to embodiments of the present application.

Figure 14:
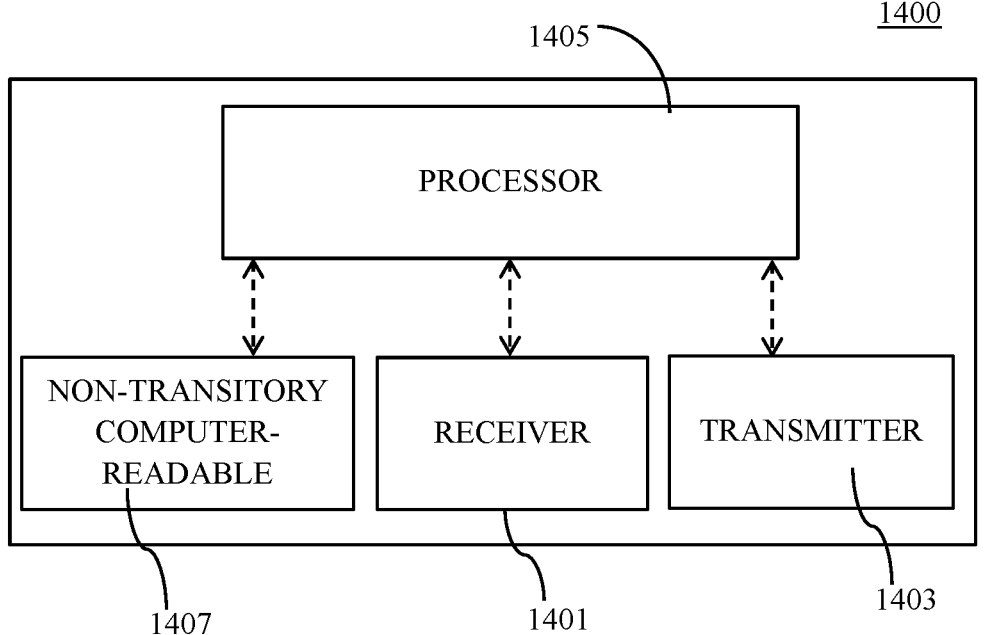
FIG. 14 illustrates another apparatus according to some other embodiments of the present application.

FIG. 14 illustrates another apparatus according to some embodiments of the present application. In some embodiments of the present disclosure, the apparatus 1400 may be the BS in the above embodiments of the present application.

As shown in FIG. 14, the apparatus 1400 may include a receiver 1401, a transmitter 1403, a processer 1405, and a non-transitory computer-readable medium 1407. The non-transitory computer-readable medium 1407 has computer executable instructions stored therein. The processer 1405 is configured to be coupled to the non-transitory computer readable medium 1407, the receiver 1401, and the transmitter 1403. It is contemplated that the apparatus 1400 may include more computer-readable mediums, receiver, transmitter and processors in some other embodiments of the present application according to practical requirements. In some embodiments of the present application, the receiver 1401 and the transmitter 1403 are integrated into a single device, such as a transceiver. In certain embodiments, the apparatus 1400 may further include an input device, a memory, and/or other components.

In some embodiments of the present application, the non-transitory computer-readable medium 1407 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure. In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. An apparatus for wireless communication, comprising: at least one memory; and
at least one processor coupled with the at least one memory and configured to cause the apparatus to:
receive configuration information on conditional handover (CHO); and
transmit time information of CHO in response to at least one failure that occurs during a CHO procedure,
wherein the time information includes a first failure time since an event to a CHO failure during the CHO procedure and a second failure time since the CHO failure during the CHO procedure.

2. The apparatus of claim 1, wherein the first failure time comprises
a first time information indicating time elapsed since a first CHO configuration execution initialization until a first CHO failure;
a second time information indicating time elapsed since a first CHO configuration evaluation initialization until the first CHO failure;
a third time information indicating time elapsed for a first CHO configuration evaluation;
a fourth time information indicating time elapsed since the first CHO configuration execution initialization until a second CHO failure;
a fifth time information indicating time elapsed since a second CHO configuration execution initialization until the second CHO failure;
a sixth time information indicating time elapsed since the first CHO configuration evaluation initialization until the second CHO failure;
a seventh time information indicating time elapsed since the first CHO configuration execution initialization until radio link failure after a second CHO success;
an eighth time information indicating time elapsed since the second CHO configuration execution initialization until the radio link failure after the second CHO success;
a ninth time information indicating time elapsed since the first CHO configuration evaluation initialization until radio link failure after the second CHO success; or
a tenth time information indicating time elapsed since a last handover until the radio link failure during the first CHO configuration evaluation.

3. The apparatus of claim 2, wherein the second failure time comprises:
an eleventh time information indicating time elapsed since the first CHO failure;
a twelfth time information indicating time elapsed since the radio link failure after the second CHO success; or
a thirteenth time information indicating time elapsed since the second CHO failure.

4. The apparatus of claim 2, wherein the at least one processor is configured to cause the apparatus to transmit the time information of CHO by: when a second CHO is not configured for a UE after the first CHO failure occurs, transmitting the first failure time comprising:
the first time information;
the second time information; or
the third time information.

5. The apparatus of claim 2, wherein the at least one processor is configured to cause the apparatus to transmit the time information of CHO by: when a second CHO is configured and the second CHO success after the first CHO failure occurs, transmitting the failure time of CHO comprising:
the first time information;
the second time information; or
the third time information.

6. The apparatus of claim 2, wherein the at least one processor is configured to cause the apparatus to transmit the time information of CHO by: when the radio link failure occurs during the first CHO configuration evaluation, transmitting the failure time of CHO comprising:
the eighth time information; or
the tenth time information.

7. The apparatus of claim 1, wherein the at least one processor is further configured to cause the apparatus to: transmit cell information associated with CHO.

8. The apparatus of claim 6, wherein the cell information associated with CHO comprises:

triggered cell IDs;

a selected cell ID; or cell ID lists fulfilling part of or all of a plurality of handover execution conditions for CHO.

9. An apparatus, comprising:

at least one memory; and at least one processor coupled with the at least one memory and configured to cause the apparatus to:

receive time information of conditional handover (CHO) in response to at least one failure that occurs during a CHO procedure at a user equipment (UE), wherein the time information includes a first failure time since an event to a CHO failure during the CHO procedure and a second failure time since the CHO failure during the CHO procedure.

10. The apparatus of claim 9, wherein the first failure time comprises at least one of:

a first time information indicating time elapsed since a first CHO execution configuration initialization until a first CHO failure;

a second time information indicating time elapsed since a first CHO configuration evaluation initialization until the first CHO failure;

a third time information indicating time elapsed for the first CHO configuration evaluation;

a fourth time information indicating time elapsed since the first CHO configuration execution initialization until a second CHO failure;

a fifth time information indicating time elapsed since a second CHO configuration execution initialization until the second CHO failure;

a sixth time information indicating time elapsed since the first CHO configuration evaluation initialization until the second CHO failure;

a seventh time information indicating time elapsed since the first CHO configuration execution initialization until radio link failure after a second CHO success;

an eighth time information indicating time elapsed since the second CHO configuration execution initialization until the radio link failure after the second CHO success;

a ninth time information indicating time elapsed since the first CHO configuration evaluation initialization until radio link failure after the second CHO success; or a tenth time information indicating time elapsed since a last handover until the radio link failure during the first CHO configuration evaluation.

11. The apparatus of claim 10, wherein the second failure time comprises:

an eleventh time information indicating time elapsed since the first CHO failure;

a twelfth time information indicating time elapsed since the radio link failure after the second CHO success; or a thirteenth time information indicating time elapsed since the second CHO failure.

12. The apparatus of claim 10, wherein the at least one processor is configured to cause the apparatus to receive the time information of CHO by: when a second CHO is not configured for the UE after the first CHO failure occurs, receiving the first failure time comprising:

the first time information;

the second time information; or the third time information.

13. The apparatus of claim 10, wherein the at least one processor is configured to cause the apparatus to receivin-greceive the time information of CHO bycomprises:

in the case thatwhen a second CHO is configured and the second CHO succeeds after the first CHO failure occurs, receiving the failure time of CHO comprising at least one of:

the first time information;

the second time information; or the third time information.

14. The apparatus of claim 10, wherein the at least one processor is configured to cause the apparatus to receive the time information of CHO by: when the radio link failure occurs during the first CHO configuration evaluation, receiving the failure time of CHO comprising:

the eighth time information; or the tenth time information.

15. The apparatus of claim 9, wherein the at least one processor is further configured to cause the apparatus to: receive cell information associated with CHO.

16. The apparatus of claim 9, wherein the time information of CHO further comprises:

multiple time information of CHOs; and a corresponding failed cell ID for each time information of CHO.

17. The apparatus of claim 9, wherein the at least one processor is further configured to cause the apparatus to: detect a failure type according to the time information of CHO.

18. A method performed by a user equipment (UE), the method comprising:

receiving configuration information on conditional handover (CHO); and transmitting time information of CHO in response to at least one failure that occurs during a CHO procedure, wherein the time information includes a first failure time since an event to a CHO failure during the CHO procedure and a second failure time since the CHO failure during the CHO procedure.

*    *    *    *    *